(12) United States Patent
Nagae et al.

(10) Patent No.: US 7,251,716 B2
(45) Date of Patent: Jul. 31, 2007

(54) METHOD AND SYSTEM FOR DATA PROCESSING WITH RECOVERY CAPABILITY

(75) Inventors: Noriko Nagae, Yokohama (JP); Nobuo Kawamura, Atsugi (JP); Takayoshi Shimokawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 189 days.

(21) Appl. No.: 10/849,222

(22) Filed: May 20, 2004

(65) Prior Publication Data

US 2005/0251625 A1 Nov. 10, 2005

(30) Foreign Application Priority Data

Apr. 28, 2004 (JP) ............................. 2004-132485

(51) Int. Cl.
*G06F 12/00* (2006.01)
(52) U.S. Cl. ...................... 711/170; 711/129
(58) Field of Classification Search ................ None
See application file for complete search history.

(56) References Cited

U.S. PATENT DOCUMENTS

| | | | |
|---|---|---|---|
| 6,295,594 B1 * | 9/2001 | Meier ...................... | 711/171 |
| 6,732,124 B1 * | 5/2004 | Koseki et al. .............. | 707/202 |
| 6,895,416 B2 * | 5/2005 | Gara et al. ................. | 707/204 |
| 2004/0010499 A1 | 1/2004 | Ghosh et al. | |
| 2004/0123068 A1 | 6/2004 | Hashimoto | |
| 2004/0139124 A1 | 7/2004 | Kawamura et al. | |
| 2004/0158764 A1 | 8/2004 | Sonoda et al. | |
| 2004/0236984 A1 | 11/2004 | Yamasaki | |

FOREIGN PATENT DOCUMENTS

WO WO99/40516 8/1999

OTHER PUBLICATIONS

Abraham Silberscatz et al., "Database System Concepts", WCB McGraw-Hill, 1997, pp. 511-535.

* cited by examiner

*Primary Examiner*—Reginald Bragdon
*Assistant Examiner*—Horace L. Flournoy
(74) *Attorney, Agent, or Firm*—Mattingly, Stanger , Malur & Brundidge, P.C.

(57) ABSTRACT

The data processing system controls, from the database management system on a host computer, the storage device subsystem which stores log data supplied from the database management system; allocates on a disk cache in the storage device subsystem in advance a log-dedicated buffer area of a size equal to that of the log data output between checkpoints; writes log data into the buffer area; and, in the event of a host computer failure, reads out the log data from the disk cache without making access to a disk device. Since the log information required for the recovery of the data processing device is cached on the storage device side, the time it takes to read the necessary log information can be shortened, which in turn reduces the system recovery time.

8 Claims, 7 Drawing Sheets

FIG. 2A

LOG CACHE MANAGEMENT TABLE

| NO | CACHE MANAGEMENT MODE | BUFFER ID |
|---|---|---|
| 1 | LOG MODE | 1 |
| 2 | LOG MODE | 2 |
| : | : | : |
| 5 | NORMAL MODE | 5 |
| : | : | : |

FIG. 2B

LOG BUFFER MANAGEMENT TABLE

| NO | CACHE BLOCK ID | BUFFER ID | PHYSICAL DEVICE ID (LUN) | RELATIVE POSITION IN PHYSICAL DEVICE (LBA) |
|---|---|---|---|---|
| 1 | BLOCK 1 | 1 | LU1 | LBA1 |
| 2 | BLOCK 2 | 1 | LU1 | LBA2 |
| 3 | BLOCK 3 | 1 | LU1 | LBA3 |
| 4 | BLOCK 4 | 1 | LU1 | LBA4 |
| : | : | : | : | : |
| 10 | BLOCK 11 | 2 | LU2 | LBA10 |
| : | : | : | : | : |

METHOD AND SYSTEM FOR DATA PROCESSING WITH RECOVERY CAPABILITY

INCORPORATION BY REFERENCE

The present application claims priority from Japanese application JP2004-132485 filed on Apr. 28, 2004, the content of which is hereby incorporated by reference into this application.

BACKGROUND OF THE INVENTION

The present invention relates to a data processing technology which realizes in a storage device a log data caching that is normally performed by a data processing device which executes transaction processing.

In recent years there are growing calls for computer systems to provide uninterrupted services and a system down time is considered as a loss. To reduce the system down time, a fast system recovery technology is essential and a recovery support system using a storage technology in particular is being called for.

In a conventional database management system, a host computer transfers data blocks and log blocks representing data block history to and from a storage device subsystem. To improve an efficiency of input/output processing, a buffer is set on a memory of the host computer and the data blocks and log blocks are cached on this buffer to minimize the input/output processing between the host computer and the storage device.

In the database management system, if in the event of a failure the recovery processing were executed using only logs, a recovery time would become inhibitively large. To minimize the recovery time, a checkpoint is performed periodically to guarantee a database consistency. When a checkpoint is retrieved, updated data blocks cached in the buffer are all written out onto the storage device to store management information required for the system restarting processing. Thus, since the checkpoint becomes a starting point at which the system restarting processing is initiated, the logs older than the checkpoint are not necessary, making the recovery time that much shorter. Generally, the checkpoint is often performed when the number of log blocks output during operation reaches a predetermined value. Such a technology is described in Abraham Silberschatz, Henry F. Korth, S. Sudarshan: "Database System Concepts", McGraw-Hill Companies, 1997, pp. 511-535.

A technology for improving an efficiency of input/output processing on the storage device subsystem side uses a disk cache. If data requested by the host computer exists in the disk cache, the data can be retrieved simply by transferring the data in the disk cache to the host computer without accessing the disk device, thus speeding up the input/output processing. A conventional method of controlling an allocation of disk caches applies a LRU (Least Recently Used) algorithm and a FIFO (First-In First-Out) algorithm according to an operation mode specified by an operating system on the host computer. A means to improve a disk cache hit rate is described in WO99/40515. The proposed method to perform an efficient control of disk cache allocation in an environment where a plurality of applications are running multiplexingly, involves retrieving an access frequency for each divided area on the disk device and, when allocating disk caches, flushing the data blocks stored in the disk caches beginning with the data block whose access frequency is low.

SUMMARY OF THE INVENTION

A disk cache allocation processing in the storage device subsystem, however, uses only the access frequency and registration order of data blocks. Therefore, it is preferable to provide the disk cache allocation which can be controlled by applications on the host computer.

Further, in the event of a failure of the database management system, when log data required for the recovery processing is read out from the storage device subsystem, it is preferable to provide a disk cache hit for the log data which can be guaranteed. This means that accesses need to be made to the disk device, which does not take much time, giving rise to a possibility of the recovery processing requiring a short period of time.

An object of the present invention is to control the storage device subsystem from the database management system on a host computer to guarantee a disk cache hit for entire log data required for recovery processing, thereby speeding up a log data reading operation in the event of a system failure and reducing a system recovery time.

The data processing system of this invention controls, from the database management system on a host computer, the storage device subsystem which stores log data supplied from the database management system; allocates on a disk cache in the storage device subsystem in advance a log-dedicated buffer area of a size equal to that of the log data output between checkpoints; writes log data into the buffer area; and, in the event of a host computer failure, reads out the log data from the disk cache without making access to a disk device.

Further, upon receiving a new checkpoint notification from the database management system on the host computer, the storage device subsystem outputs the log data stored in the disk cache to the disk device.

Since the log information required for the recovery of the data processing device is cached on the storage device side, the time it takes to read the necessary log information can be shortened, which in turn reduces the system recovery time.

DESCRIPTION OF THE EMBODIMENTS

The present invention will be described in detail by referring to the accompanying drawings.

Figure 1:
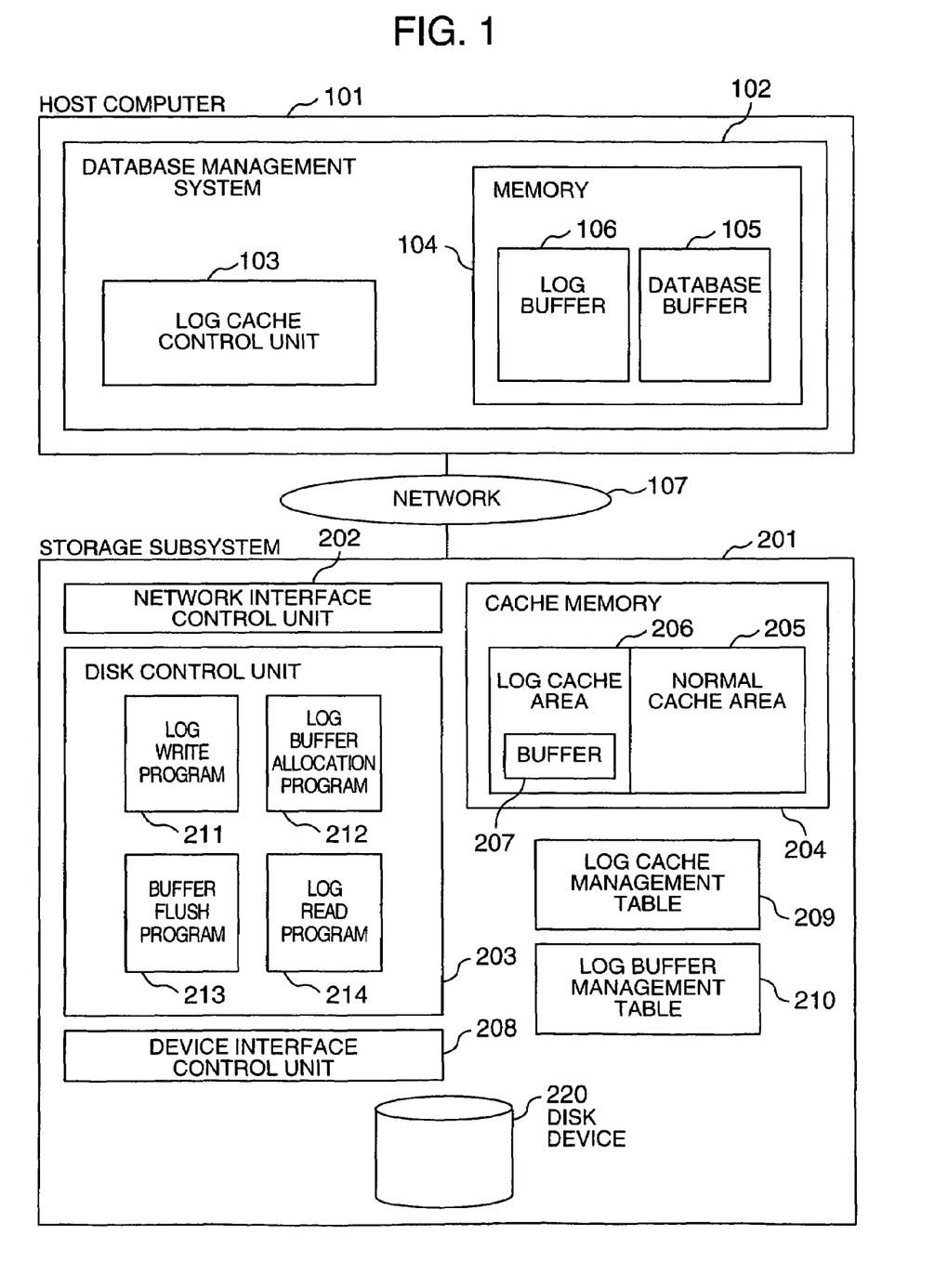
FIG. 1 shows a system configuration.

FIG. 1 illustrates a system configuration of one embodiment of this invention. A host computer 101 and a disk subsystem 201 are interconnected via a network 107. In the host computer 101 a database management system 102 is in operation and has a database buffer 105 and a log buffer 106 in a memory 104. In the disk subsystem 201 a network interface control unit 202 receives a command from the host computer and a disk control unit 203 accesses a disk device 220 through a device interface control unit 208. Since the disk device 220 is a low-speed device, all input/output processing is executed through a cache memory 204. The cache memory 204 is used to temporarily hold data to be written into the disk device 220 when a write request is issued from the host computer 101. Since a write operation completion is informed to the host computer 101 when the write data has been written into the cache memory 204, this arrangement can make the data writing operation appear to be performed at high speed. When data is read out, the cache memory 204 is used to temporarily store read data. When the host computer 101 requests the same data from the disk subsystem 201, the data is returned from the cache memory 204 to the host computer 101 thus speeding up the reading operation.

In this embodiment, the cache memory 204 in the disk subsystem 201 is managed by dividing it into a log cache area 206 and a normal cache area 205. The disk control unit 203 performs control to execute the input/output operation on a log block through the log cache area 206 and the input/output operation on a data block through the normal cache area 205. Information on the log cache area 206 is registered with a log cache management table 209.

Processing to allocate an area for a log buffer 207 on the log cache area 206 is performed when the disk subsystem 201 receives a first log block write command following a starting of a program in the database management system 102 or a retrieval of a checkpoint. The database management system 102 informs the disk subsystem 201 of a log block write command and a size of the log buffer 207. Here, the size of the log buffer 207 specified is one that matches the amount of log block to be output in a period between the checkpoints. The disk subsystem 201 starts a log buffer allocation program 212 in the disk control unit 203 and allocates the log buffer 207 of that size on the log cache area 206 in the cache memory 204. At this time, information on the log buffer 207 thus allocated is registered with the log cache management table 209. While an example of a database management system is taken up in this explanation, this invention is effectively applied to a transaction processing monitor system that generates log information and to programs that generate log information. The above disk subsystem can also be applied to disk array systems or array disk systems and disk devices.

Next, an operation during transaction processing will be explained. When the database management system 102 receives a request to update data stored in database, for example, the database management system 102 writes data necessary for recovery (such as line identifiers) in the log buffer 106 and then writes updated data in the database buffer 105. If the database management system 102 receives a COMMIT request representing a completion of the transaction or if the log buffer 106 overflows, the database management system 102 transfers data from the log buffer 106 to the disk subsystem 201. The disk subsystem 201 calls up a log write program 211 from the disk control unit 203 to write the log data received from the database management system 102 into the log buffer 207 allocated on the log cache area 206. At this time, the log write program 211 updates information on the log buffer 207 in a log buffer management table 210.

In the database management system 102, when the amount of log block output reaches a predetermined volume or a command is issued, a checkpoint is retrieved. At this time, in this embodiment a log cache control unit 103 in the database management system 102 notifies a buffer flush command to the disk subsystem 201 which in turn starts a buffer flush program 213 in the disk control unit 203. The buffer flush program 213 flushes all data written in the log buffer 207 into the disk device 220 and frees the area from the log buffer 207. At this time, information on the data stored in the log buffer 207 is deleted from the log cache management table 209 and from the log buffer management table 210.

In the event of a failure, the database management system 102 is restarted by requesting the disk subsystem 201 to read the log data to recover a previous state of the database. The log data necessary in this embodiment is those following the last checkpoint which were retrieved before the failure occurred. Thus, the use of the control system for the log cache area of this embodiment ensures that all the log blocks of log data that were read out exist in the log buffer 207 of the cache memory 204 of the disk subsystem 201, eliminating the need to access the disk device 220, allowing the log data reading operation to be executed that much faster.

By using the disk subsystem 201 proposed in this embodiment, the log buffer 207 can be used in place of the log buffer 106 of the database management system 102. That is, the database management system 102 may store the log information directly in the log buffer 106. The aforementioned programs for implementing this embodiment are recorded in media, such as CD-ROMs, and then installed in a magnetic disk before being loaded into memory for execution. The media for recording the programs may be other than CD-ROMs. The programs may be used through installation from the media onto an information processing device or by accessing the associated media via a network. The same can be said of programs of other devices.

Figure 2A:
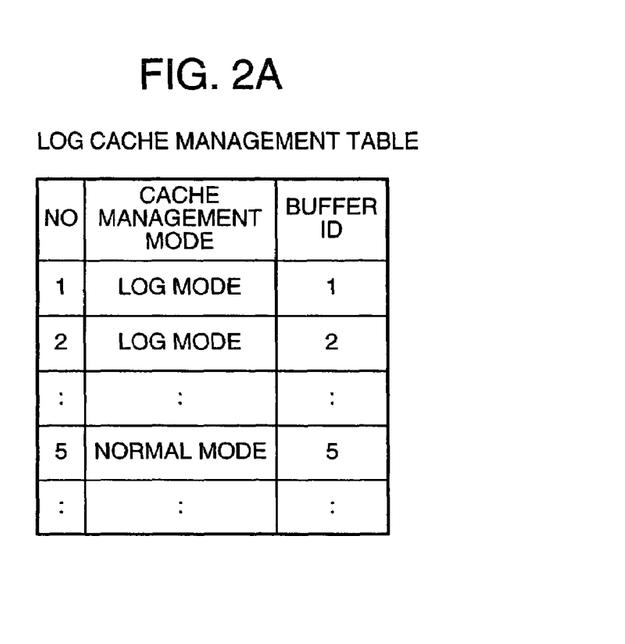
FIG. 2A shows a configuration of a log case management table.
Figure 2B:
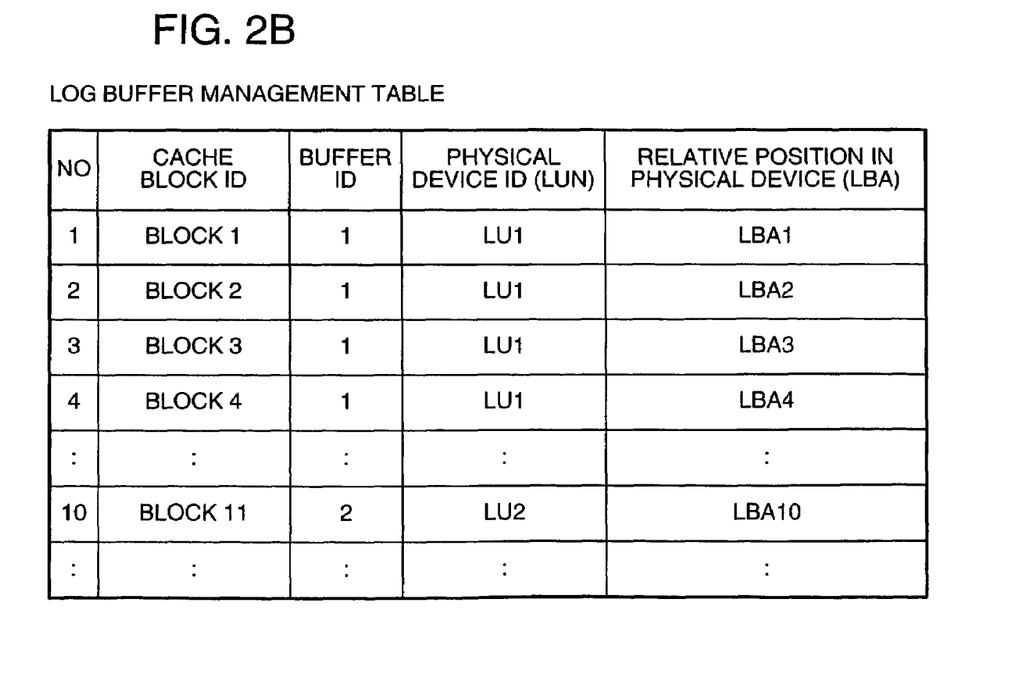
FIG. 2B shows a configuration of a log buffer management table.

FIG. 2A shows a structure of a management table used in managing the log cache area. The log cache management table corresponds to the log cache management table 209 in FIG. 1. As shown in FIG. 1, the control of the cache memory 204 in the disk subsystem 201 is performed on the log cache area 206 and the normal cache area 205 separately. When the cache memory is not large enough to allocate an area for the log buffer 207, the cache management is performed by an application software in a storage system such as the disk subsystem. To manage this cache control mode a log cache management table shown in FIG. 2A is used. The normal mode represents a cache management by the host computer and the log mode represents a cache management of this embodiment. A log buffer management table of FIG. 2B corresponds to the log buffer management table 210 of FIG. 1. The log buffer management table has registered therein information on log blocks written in the log buffer 207. Files making up the log data area are mapped onto logical volumes by an operating system on the host computer. Further, the logical volumes are mapped as device files associated with disks of the disk subsystem. In the disk subsystem the device files correspond to LUs (Logical Units). Thus, the files making up the log data area are eventually mapped onto a physical device. The corresponding physical information includes a LUN (Logical Unit Number) which is a physical device ID identifying a physical device in the disk subsystem 201 and a LBA (Logical Block Address) which is a relative position in the physical device. The log write and read command notified from the database management system 102 are executed on the physical level described above through the operating system on the host computer 101. The log buffer management table 210 manages physical information on the log block specified by the command, information on a log block storage position in the cache memory 204, and information identifying a target log buffer area.

Figure 3A:
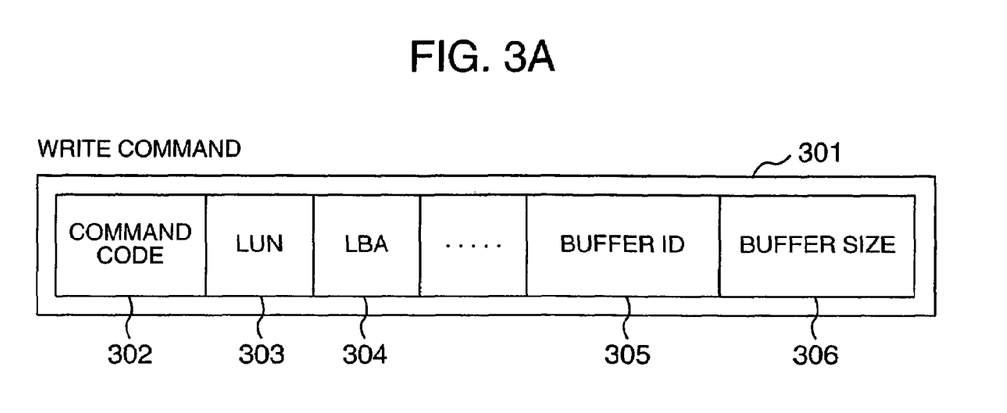
FIG. 3A shows a structure of a log write command.
Figure 3B:
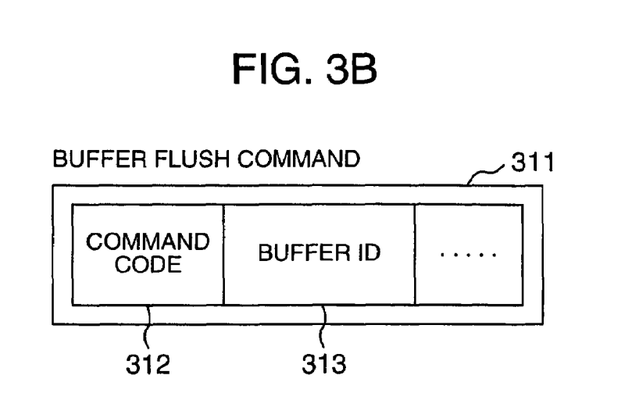
FIG. 3B shows a structure of a log buffer flush command.

FIG. 3A and FIG. 3B show example commands used to control the log cache area 206. A command 301 in FIG. 3A is one issued from the host computer 101 to the disk subsystem 201 to instruct the latter to write log data. A command 311 in FIG. 3B is one issued from the host computer 101 to the disk subsystem 201 to instruct the latter to write a log block stored in the log buffer 207 into the disk device 220. The command 301 comprises a command code 302, a LUN 303, a LBA 304, a buffer ID 305, a buffer length 306 and others. The command 311 comprises a command code, a buffer ID and others. The command codes 302, 312 are write and buffer flush, respectively. The LUN 303 represents a physical device ID and the LBA 304 represents a relative position in the physical device. The buffer IDs 305, 313 represent information identifying the log buffers. The buffer IDs are managed by the database management system 102 on the host computer 101. The buffer length represents a length of a log buffer allocated in the cache memory 204.

Figure 4:
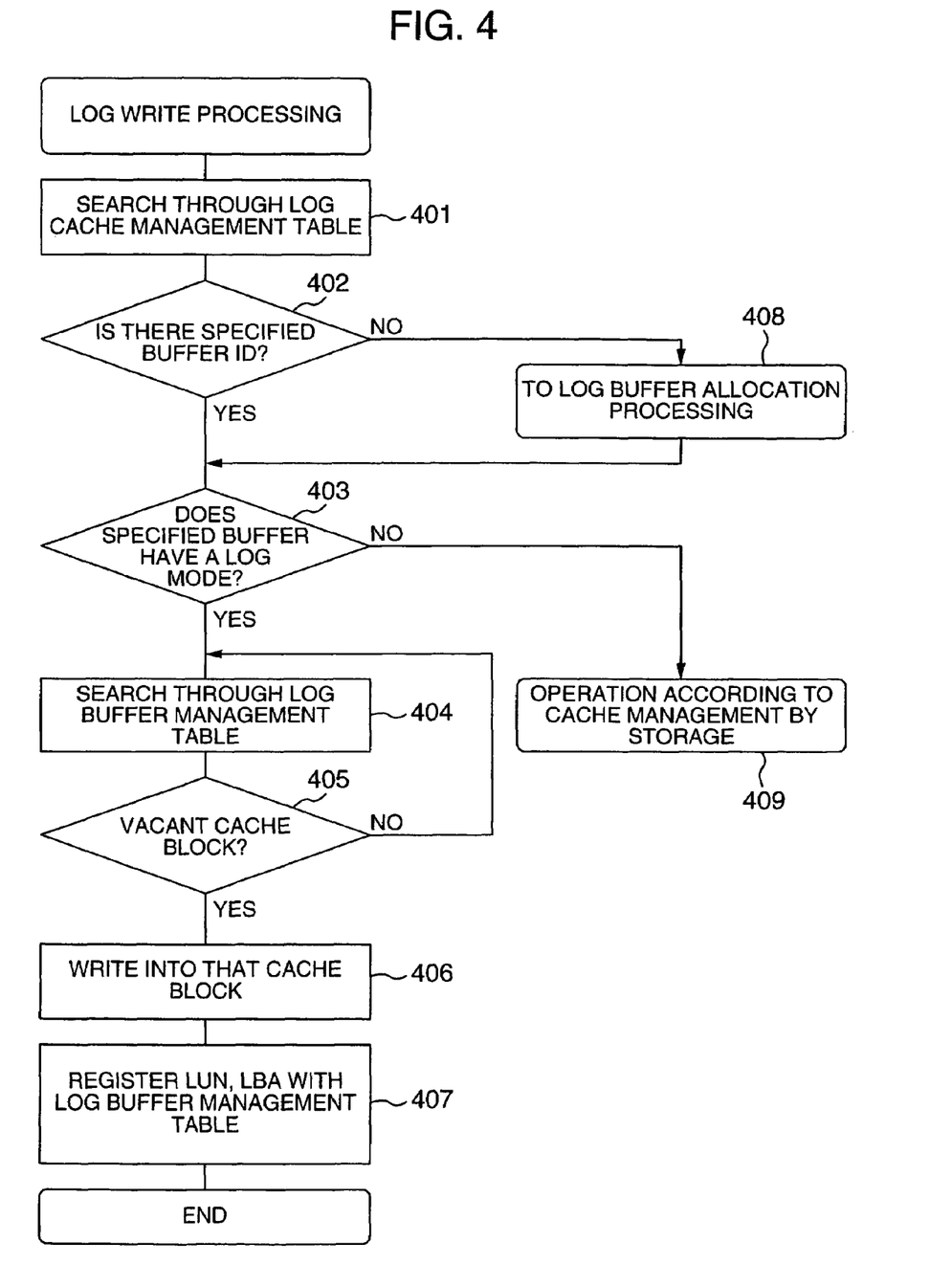
FIG. 4 is a flow of log write processing in the disk subsystem.

FIG. 4 shows a processing flow performed by the log write program 211. A step 401 searches through the log cache management table 209 based on a buffer ID attached to the command. If the matching buffer ID is not found in the table, this command represents a first write operation after the database management system has been started or the checkpoint has been retrieved. So the processing moves to a log buffer securing operation 408. If the matching buffer ID is found registered or if the log buffer securing operation 408 is finished, the processing moves to step 403 where it checks the cache management mode. When the cache management mode is a "normal mode", a write operation according to the conventional cache management is performed. When the cache management mode is a "log mode", the processing moves to step 404 where it searches through the log buffer management table 210 based on a buffer ID attached to the command to find a vacant cache block. If a vacant cache block is found, the processing moves to step 406 where it writes the content of the log block received from the host computer 101 into the cache block. Step 407 registers with the log buffer management table 210 the LUN and LBA representing a destination in the disk device 220 of the log block written at step 406. For the management of order of the cache blocks in the log buffer, a normal algorithm such as list algorithm may be used.

Figure 5:
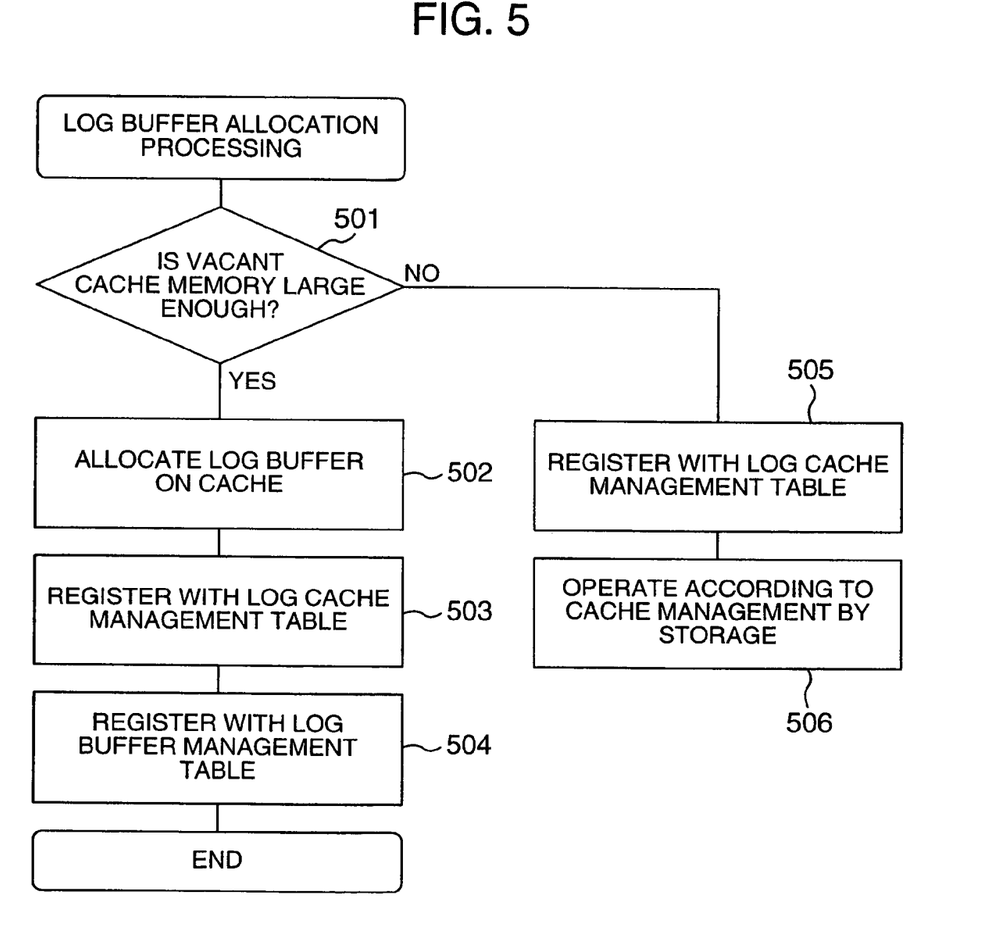
FIG. 5 is a flow of log buffer allocation processing in the disk subsystem.

FIG. 5 shows a flow of the log buffer securing processing. Step 501 checks the buffer length 306 attached to the command 301 to see if a vacant area in the cache memory 204 is large enough. If the vacant area is not large enough, the processing moves to step 505 where it performs the conventional cache management without securing the log buffer 207. At this time, the cache management mode is registered as "normal mode" with the log cache management table 209 to allow the cache management mode, log mode or normal mode, to be identified according to the buffer ID attached to the command when performing the log write or read operation at step 504. That is, if the result of step 501 is yes, the processing moves to step 502 to allocate the log buffer 207 on the cache memory 204. At step 503 and step 504, information on the allocated log buffer is registered with the log cache management table 209 and the log buffer management table 210, respectively.

Figure 6:
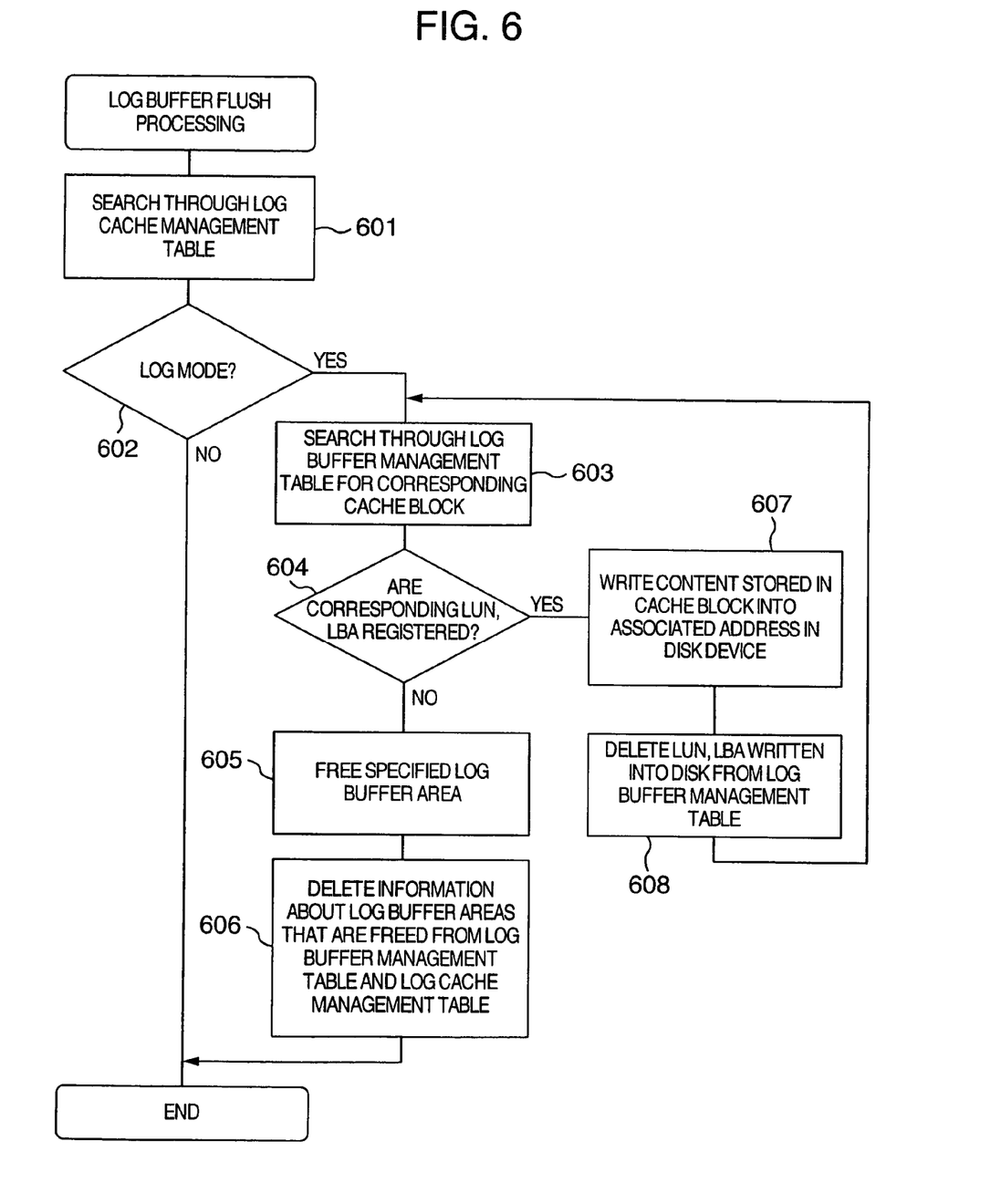
FIG. 6 is a flow of log buffer flush processing in the disk subsystem.

FIG. 6 shows a flow of the buffer flush program 213. Step 601 searches through the log cache management table 209 for a log buffer based on the buffer ID attached to the command. If the matching buffer is found, step 602 checks the cache management mode. If the cache management mode is not the log mode, the command represents a normal cache control and the processing is exited. If the cache management mode is the log mode, the processing proceeds to step 603 where it searches through the log buffer management table 210 for a cache block that matches the buffer ID attached to the command. If the cache block thus found has LUN and LBA that represent a destination in the disk device 220 where the cache block is to be stored, the processing moves to step 607 where it writes the content of the log block into the destination location in the disk device 220 specified by the LUN and LBA of the log buffer management table 210. With the writing into the disk device 220 completed, the LUN and LBA information of the log block stored in the cache block are deleted from the log buffer management table 210. The operations from step 603 to step 608 are repetitively performed on all the cache blocks assigned with the log buffers of the buffer ID attached to the command until the step 604 decides that the registered LUN and LBA no longer exist. After the writing of the log blocks stored in the log buffer into the disk device 220 is finished, the processing proceeds to step 605 where it frees the log buffer area of interest. At step 606 all the information on the freed log buffer areas is deleted from the log cache management table 209 and the log buffer management table 210.

A log data read operation in the event of a failure is carried out as follows. Based on a buffer ID or LUN and LBA attached to a log read command the log buffer management table 210 is searched to read a log block stored in the log buffer 207. At this time since the disk device 220 is not accessed, the recovery processing can be performed at high speed.

There is a case where data and logs of a plurality of database management systems are stored on the same disk subsystem. This invention is also applicable to such a case. For example, ID information of each host computer and programs running on it may be provided as log buffer IDs. This arrangement allows the log buffers controlled by the plurality of database management systems to be managed in one group.

Figure 7A:
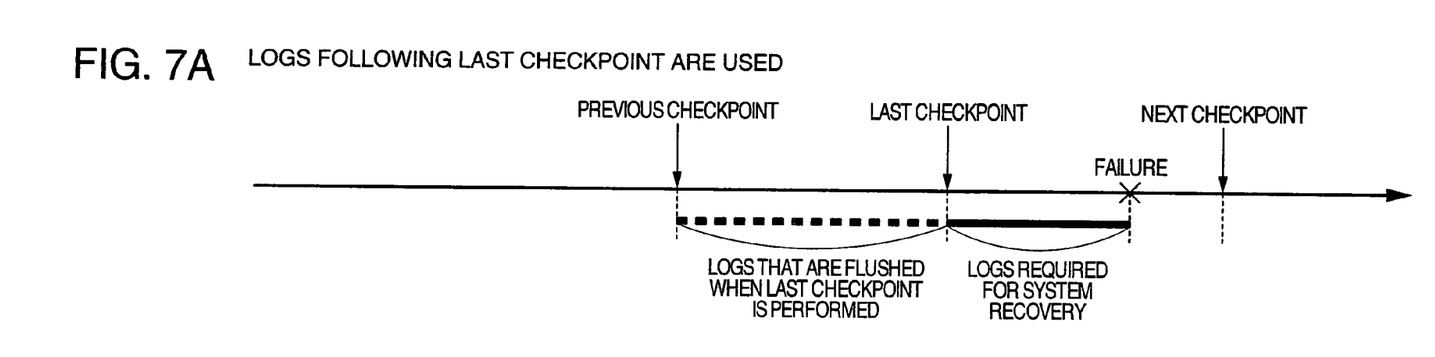
FIG. 7A shows a variation in which log data for one checkpoint is left in the memory.

When resuming an operation of the database system following a failure, a range of log data required for the recovery of the database will vary depending on how the database management system is configured. Explanations thus far assumes a case of FIG. 7A.

Figure 7B:
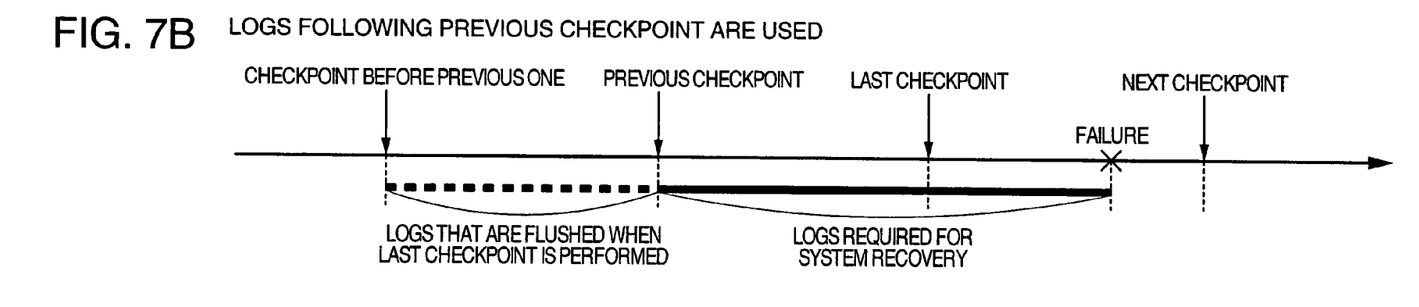
FIG. 7B shows another variation in which log data for a plurality of checkpoints is left in the memory.

The embodiment that follows can deal with cases other than the above. For example, FIG. 7B represents a case in which log data required for the recovery of the database ranges from the time of a previous checkpoint up to the time of the failure occurrence. One example method of recovery in this case involves preparing two log buffer areas and managing these two buffers on the database management system 102 side. When the database management system 102 retrieves a checkpoint, it specifies in the buffer ID attached to the buffer flush command issued to the disk subsystem 201 a buffer that stores the log blocks up to the previous checkpoint. The buffer flush program 213 therefore needs only to write the log blocks stored in the log buffer with the buffer ID of the command into the disk device 220 and free that buffer. With this arrangement, it is possible to prepare a plurality of log buffer areas (for a predetermined number of checkpoints) and to store the logs for the predetermined number of checkpoints into the log cache areas. By deleting the log information from the predetermined number of log cache areas beginning with the chronologically oldest one, it is possible to allocate a predetermined number of checkpoints in the cache areas.

Figure 7C:
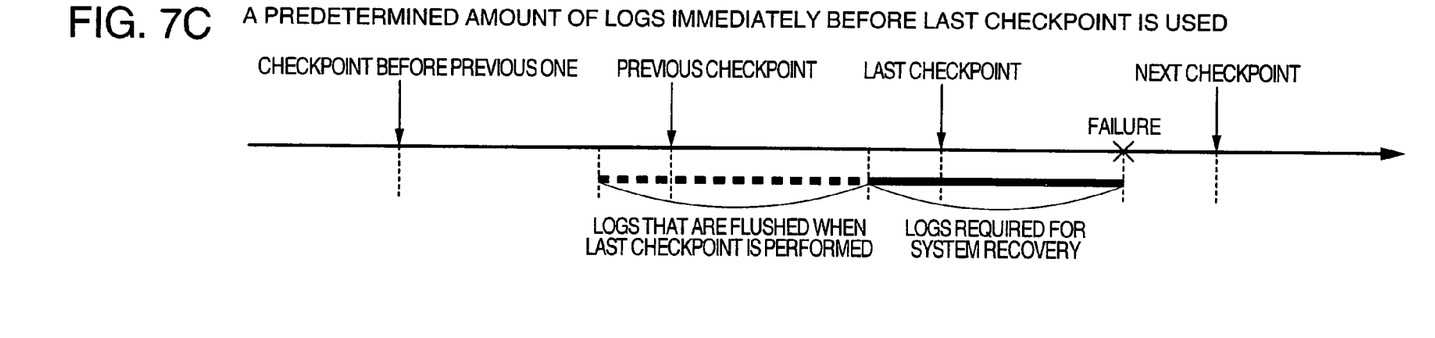
FIG. 7C shows still another variation in which a predetermined amount of log data is left in the memory.

FIG. 7C represents a case in which required log data ranges from a point in time a predetermined data amount before the last checkpoint to the time of failure occurrence. One example method of recovery is as follows. When the database management system 102 retrieves a checkpoint and issues a buffer flush command to the disk subsystem 201, not only is the command specified with buffer IDs up to a time of retrieving the checkpoint (buffer IDs to be flushed), but it is also specified with buffer IDs up to a time of retrieving the next checkpoint (new buffer IDs) and with a log size (the number of log blocks) immediately before the checkpoint that should be left in the log buffer. Upon receiving this command, the buffer flush program 213 in the disk subsystem 201 leaves in the cache memory a specified number of log blocks present immediately before the checkpoint and flushes the other log blocks into the disk device 220. Next, the buffer IDs on the log buffer management table for the log blocks remaining in the cache memory are updated to new buffer IDs. The areas for those log blocks that were flushed into the disk device 220 are freed and deleted from the log buffer management table. A log write command issued immediately after the checkpoint was retrieved is specified with the new buffer IDs that were specified in the buffer flush command to allocate new log buffer areas so that the log blocks remaining on the cache memory can be accessed as by pointing beginning with the latest log block. Those log data going back from the present up to a predetermined time can also be left in the cache buffer with ease.

By making the cache memory in the disk subsystem controllable from the database management system on the host computer, the entire log data necessary for recovery processing can be put on the cache at all times. Thus, when the database management system fails and a system recovery operation is initiated, a request to read logs can result in a cache hit, obviating the need to access the disk device, which in turn shortens the time it takes to recover the system operation.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A data processing system comprising:
   a data processing device to execute transaction processing; and
   a storage device to store both data to be processed by the data processing device and log data generated during the transaction processing;
   wherein the data processing device sends an area allocation request to the storage device, the area allocation request including a size and an identifier of an area in a memory of the storage device to store the log data, and when the log data having been generated is to be stored, the data processing device sends a store request including identification information of the area to the storage device;
   wherein the storage device, in response to the area allocation request, allocates in the memory a log cache area having a size equal to the size defined by the area allocation request, stores in the log cache area the identifier included in the area allocation request by matching the identifier with identification information of the log cache area, and in response to the store request, stores the log data in the log cache area that matches the identification information included in the store request;
   wherein the data processing device sends to the storage device at a timing of a checkpoint during the transaction processing a notification request to notify the storage device of the checkpoint;
   wherein the storage device, upon receiving the notification request, updates the data stored on a disk device of the storage device by using the log data from the log cache area of the memory.

2. A data processing system according to claim 1, wherein the storage device deletes those of the log data stored in the memory which were generated before an immediately preceding checkpoint.

3. A data processing system according to claim 1, wherein the storage device deletes those of the log data stored in the memory which were generated before a predetermined number of checkpoints.

4. A data processing method comprising:
   executing transaction processing by a data processing device;
   storing both data to be processed by the data processing device and log data generated during the transaction processing in a storage device;
   sending by the data processing device an area allocation request to the storage device, the area allocation request including a size and an identifier of an area in a memory of the storage device to store the log data, and when the log data having been generated is to be stored, sending by the data processing device a store request including identification information of the area to the storage device; and
   in response to the area allocation request, allocating in the memory a log cache area having a size equal to the size defined by the area allocation request, storing in the area the identifier included in the area allocation request by matching the identifier with identification information of the area, and in response to the store request, storing the log data in the area that matches the identification information included in the store request, wherein the storage device allocates the log cache area, stores the identifier, and stores the log data;
   sending to the storage device by the data processing device at a timing of a checkpoint during the transaction processing, a notification request to notify the storage device of the checkpoint; and
   upon receiving the notification request, updating, by the storage device, the data stored on a disk device of the storage device by using the log data from the log cache area of the memory.

5. A data processing method according to claim 4, further comprising:
   deleting, by the storage device, those of the log data stored in the memory which were generated before an immediately preceding checkpoint.

6. A data processing method according to claim 4, further comprising:
   deleting, by the storage device, those of the log data stored in the memory which were generated before a predetermined number of checkpoints.

7. A computer-readable storage medium tangibly embodying a data processing program for operating a data processing system, the system including a data processing device for executing transaction processing and a storage device for storing both data to be processed by the data processing device and log data generated during the transaction processing, wherein the data processing program is executable by the data processing device to perform the steps of:

sending by the data processing device an area allocation request to the storage device, the area allocation request including a size and an identifier of an area in a memory of the storage device to store the log data;

when the log data having been generated is to be stored, sending by the data processing device a store request including identification information of the area to the storage device;

in response to the area allocation request, securing in the memory of the storage device a log cache area having a size equal to the size defined by the area allocation request;

storing in the area the identifier included in the area allocation request by matching the identifier with identification information of the area;

in response to the store request, storing the log data in the area that matches the identification information included in the store request;

sending to the storage device by the data processing device at a timing of a checkpoint during the transaction processing, a notification request to notify the storage device of the checkpoint; and upon receiving the notification request, updating, by the storage device, the data stored on a disk device of the storage device by using the log data from the log cache area of the memory.

8. A computer-readable storage medium tangibly embodying a data processing program in a data processing device, the program for operating a data processing system, the system including the data processing device for executing transaction processing and a storage device for storing both data to be processed by the data processing device and log data generated during the transaction processing, wherein the data processing program is executable by the data processing device to perform the steps of:

sending by the data processing device an area allocation request to the storage device, the area allocation request including information on a size of an area in a memory of the storage device to store the log data and information on position of the area in the memory;

when the log data having been generated is to be stored, sending by the data processing device a store request including position information of the area to the storage device;

in response to the area allocation request, securing in the memory of the storage device a log cache area having a size equal to the size defined by the area allocation request;

storing in the area the position information included in the area allocation request by matching the position information with the information on position of the area in the memory that was sent in advance;

in response to the store request, storing the log data in the area that matches the position information included in the store request;

sending to the storage device by the data processing device at a timing of a checkpoint during the transaction processing, a notification request to notify the storage device of the checkpoint; and upon receiving the notification request, updating, by the storage device, the data stored on a disk device of the storage device by using the log data from the log cache area of the memory.

* * * * *